United States Patent
Tyszkiewicz

(10) Patent No.: US 9,469,170 B1
(45) Date of Patent: Oct. 18, 2016

(54) VEHICLE TIRE TRACTION DEVICE

(71) Applicant: Joseph Tyszkiewicz, Bethesda, MD (US)

(72) Inventor: Joseph Tyszkiewicz, Bethesda, MD (US)

( * ) Notice: Subject to any disclaimer, the term of this patent is extended or adjusted under 35 U.S.C. 154(b) by 0 days.

(21) Appl. No.: 14/710,040

(22) Filed: May 12, 2015

(51) Int. Cl.
*B60C 27/02* (2006.01)

(52) U.S. Cl.
CPC ....... *B60C 27/0284* (2013.04); *B60C 27/0292* (2013.04)

(58) Field of Classification Search
CPC .............. B60C 27/00; B60C 27/0261; B60C 27/0269; B60C 27/0276; B60C 27/0284; B60C 27/0292; B60C 27/20
USPC ........ 152/213 R, 214, 216, 213 A, 167, 170, 152/178, 179, 208, 209.1, 209.4, 210
See application file for complete search history.

(56) References Cited

U.S. PATENT DOCUMENTS

| | | | |
|---|---|---|---|
| 3,007,506 A | 11/1961 | Bowler | |
| 3,323,572 A * | 6/1967 | Farah | B60C 27/02 152/208 |
| 3,335,776 A * | 8/1967 | Peterson | B60C 27/18 152/208 |
| 3,937,262 A * | 2/1976 | Lee | B60C 27/02 152/179 |
| 5,569,340 A * | 10/1996 | Ulrich | B60C 27/04 152/216 |
| 6,918,544 B2 | 7/2005 | Ferguson | |
| 2008/0190531 A1* | 8/2008 | Holeyfield | B60C 27/02 152/208 |

* cited by examiner

*Primary Examiner* — John Walters
(74) *Attorney, Agent, or Firm* — Crossley & Stevenson Intellectual Property Law

(57) ABSTRACT

A vehicle tire traction device including an attachment base having an upper surface, lower surface, a center portion, a first wing and a second wing. The first and second wing are continuously disposed on each of a respective right side and a left side. An adhesive layer is continuously disposed on a lower surface of each of the base, first wing and second wing. The base center portion attaches to tire tread surface. Each of the first and second wing is configured to removable attach to a respective inner and outer side wall. A biodegradable inner core is continuously disposed on an upper surface of the attachment base. An outer traction surface is continuously disposed on a top side of the inner core. The outer traction surface is configured to provide traction.

13 Claims, 2 Drawing Sheets

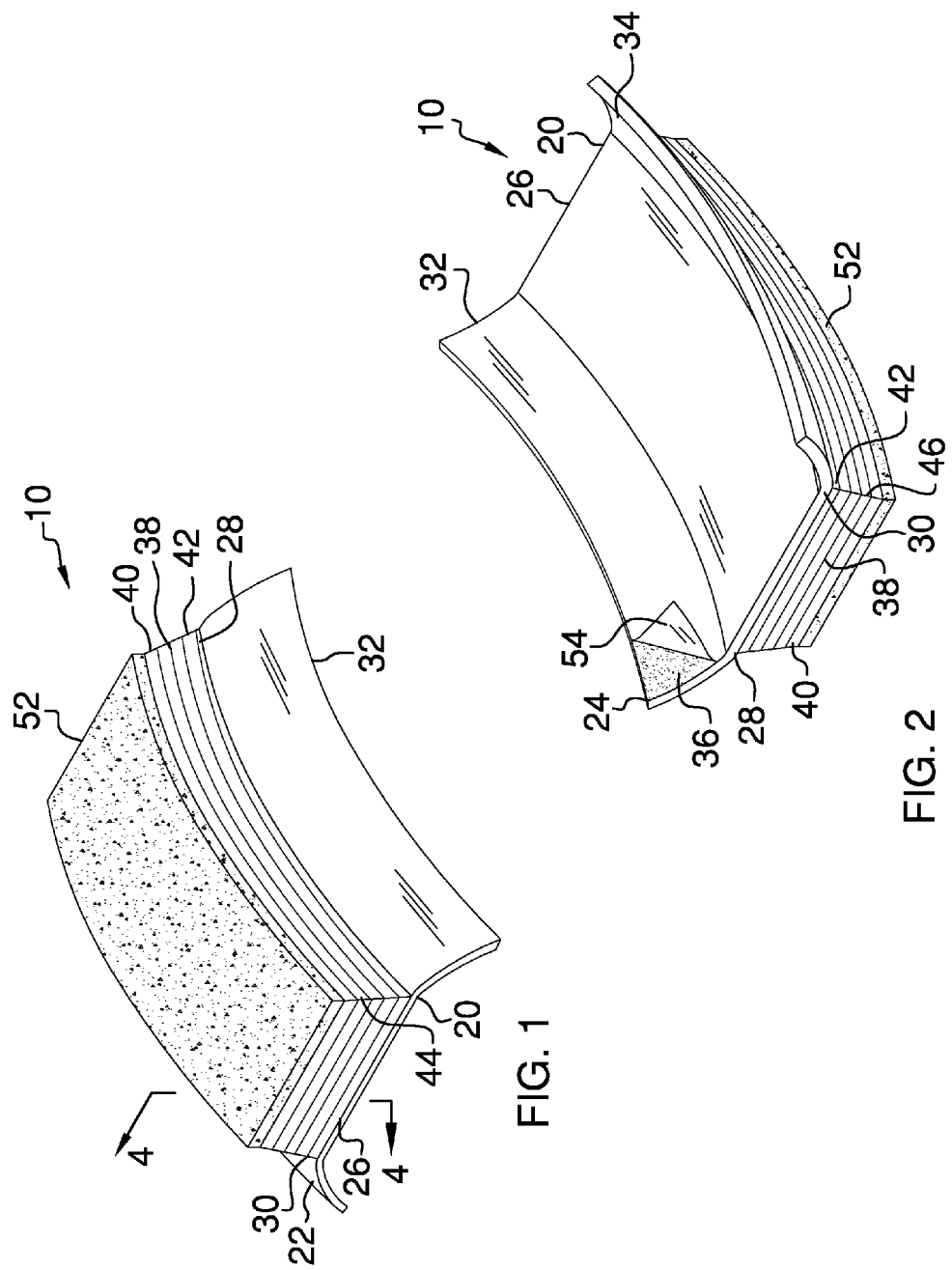

VEHICLE TIRE TRACTION DEVICE

BACKGROUND OF THE INVENTION

Various types of automobile traction devices are known in the prior art. However, what is needed is a vehicle tire traction device that improves traction of a vehicle with wheels when the vehicle is on a road covered with ice or snow. Many people use chains, cables and studs to accomplish better traction however they can be difficult to apply with proper knowledge. These other devices can also be very time consuming and inconvenient especially since application is usually required when there is inclement weather. The vehicle tire traction device prevents slippage, improves handling, and ensures efficient braking action when traveling on ice and snow. The present vehicle tire traction device provides an added measure of travel safety and helps prevent a vehicle from becoming stuck in slippery ruts. The present vehicle tire traction device is attached to the exposed parts of a tire, thus providing quick and easy installation without becoming dirty, wet or cold. The motorist may use more than one tire traction device on one or all tires of the vehicle at a desired spacing to provide maximum desired traction. Once applied, an outer traction surface digs into the ice and snow on slippery roads and enhances the stability and control to avoid sliding accidents. The present vehicle tire traction device also aids in acceleration from a standstill, turning corners, and breaking. The present vehicle tire traction device does not need to be removed as the vehicle tire traction device is biodegradable and will deteriorate without unduly affecting the driving conditions or harming the road way.

FIELD OF THE INVENTION

The present invention relates to automobile traction devices, and more particularly, to a vehicle tire traction device.

SUMMARY OF THE INVENTION

The general purpose of the present vehicle tire traction device, described subsequently in greater detail, is to provide a vehicle tire traction device which has many novel features that result in a vehicle tire traction device which is not anticipated, rendered obvious, suggested, or even implied by prior art, either alone or in combination thereof.

To accomplish this, the present vehicle tire traction device includes an attachment base. The attachment base has an upper surface, a lower surface, and a center portion. The center portion has a right end and a left end. A first wing and a second wing is continuously disposed on each respective right side and left side. An adhesive layer is continuously disposed on the lower surface of each of the center portion, the right wing, and the left wing. The adhesive layer is configured to secure the attachment base lower surface to a portion of the tire tread and each of the first wing and the second wing to a portion of each of a respective inner sidewall and outer sidewall of the tire. The center portion has a width substantially equal to a width of a tire ensuring proper attachment of the center portion to a tread of a tire and providing optimal positioning of each of the first wing and the second wing on each respective inner sidewall and outer sidewall A biodegradable inner core with a top side, a bottom side, right side, left side, front side, and a rear side. The bottom side is continuously attached to the upper surface of the center portion. The inner core has a width equal to the width of the center portion providing stability. The inner core has a depth in a range of a half an inch to three inches. The inner core is at least one of a plurality of compressed paper strips glued together in a stack, a plurality of compressed wood chips glued together in a stack and alternately other biodegradable materials to ensure proper deterioration without unduly affecting the driving conditions or harming the road way. The deterioration prevents the need to remove the tire traction device after use.

An outer traction surface is continuously disposed on the bottom side of the inner core. The outer traction surface comprises a non-slip material. The non-slip material is at least one of sand, gravel and other gripping materials. The non-slip material provides additional traction in slick conditions.

A backing is continuously removably disposed on the adhesive layer. The backing is configured to prevent unwanted sticking of the adhesive prior to use.

Multiple vehicle tire traction devices can be mounted with desired spacing on the tire to provide maximum traction desired.

Thus has been broadly outlined the more important features of the present vehicle tire traction device so that the detailed description thereof that follows may be better understood and in order that the present contribution to the art may be better appreciated.

BRIEF DESCRIPTION OF THE DRAWINGS

Figures

FIG. 1 is a top isometric view.
FIG. 2 is a bottom isometric view.

DETAILED DESCRIPTION OF THE DRAWINGS

Figure 4:
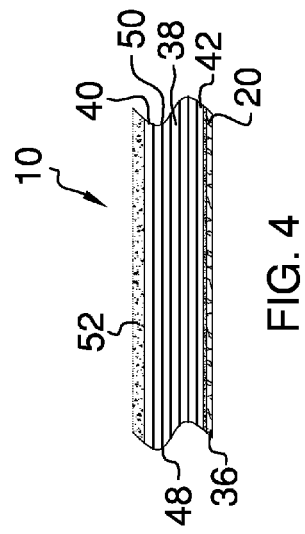
FIG. 4 is a cross-sectional view taken along lines 4-4 of FIG. 1.
Figure 3:
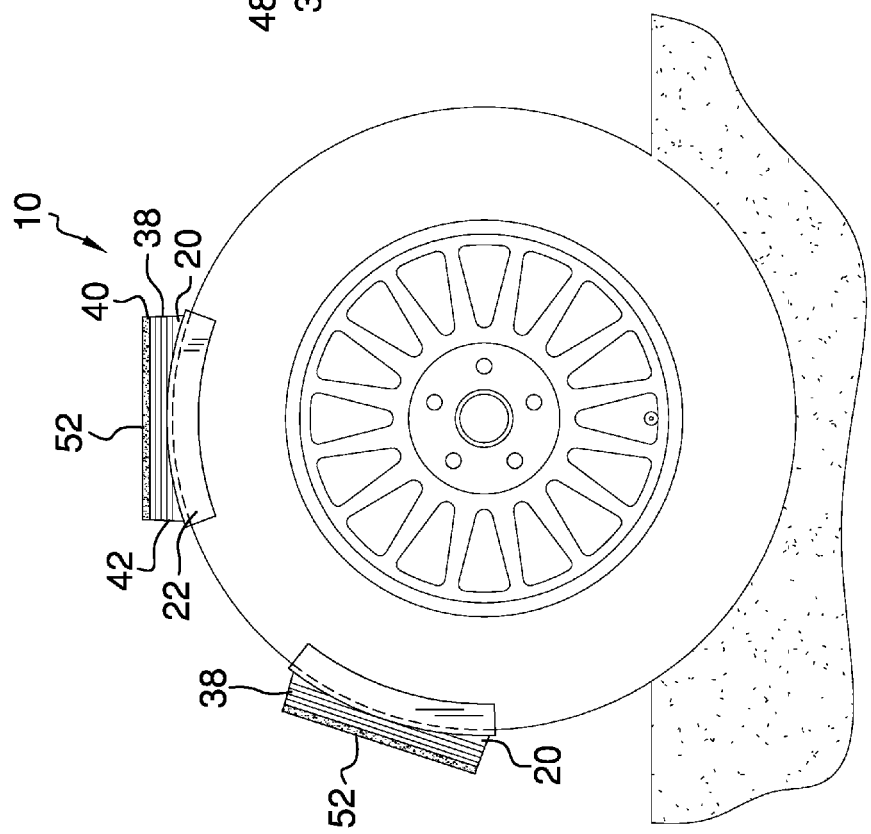
FIG. 3 is an in-use view.

With reference now to the drawings, and in particular FIGS. 1 through 4 thereof, an example of the instant vehicle tire traction device employing the principles and concepts of the present vehicle tire traction device and generally designated by the reference number 10 will be described.

Referring to FIGS. 1 through 4 the present vehicle tire traction device 10 is illustrated. The vehicle tire traction device 10 includes an attachment base 20. The attachment base 20 has an upper surface 22, a lower surface 24, and a center portion 26. The center portion 26 has a right end 28 and a left end 30. A first wing 32 and a second wing 34 is continuously disposed on each respective right end 28 and left end 30. An adhesive layer 36 is continuously disposed on the lower surface 24 of each of the center portion 26, the first wing 32, and the second wing 34. The adhesive layer 36 is configured to secure the attachment base 20 lower surface 24 to a portion of the tire tread and each of the first wing 32 and the second wing 34 to a portion of each of a respective inner sidewall and outer sidewall of the tire. The center portion 26 has a width substantially equal to a width of a tire ensuring proper attachment of the center portion 26 to a tread of a tire and providing optimal positioning of each of the first wing 32 and the second wing 34 on each respective inner sidewall and outer sidewall A biodegradable inner core 38 with a top side 40, a bottom side 42, right side 44, left side 46, front side 48, and a rear side 50. The bottom side 42 is continuously attached to the upper surface 22 of the center portion 26. The inner core 38 has a width equal to the width of the center portion 26 providing stability. The inner core 38 has a depth in a range of a half an inch to three inches. The depth of the inner core 38 promotes traction when the tire traction device 10 is applied to the tread of the tire. The inner core 38 is comprised of at least one of a plurality of compressed paper strips glued together in a stack, a plurality of compressed wood chips glued together in a stack, and other biodegradable materials compressed in a stack ensuring proper deterioration without unduly affecting the driving conditions or harming the road way. The deterioration of the tire traction device 10 prevents the need to remove the tire traction device 10 after use.

An outer traction surface 52 is continuously disposed on the bottom side 42 of the inner core 38. The outer traction surface 52 comprises a non-slip material. The non-slip material is at least one of sand, gravel and other gripping materials. The non-slip material provides maximum traction in slick conditions.

A backing 54 is continuously removably disposed on the adhesive layer 36. The backing 54 is configured to prevent unwanted sticking of the adhesive layer 36 prior to use.

Multiple vehicle tire traction devices 10 can be mounted at a desired spacing on the tire to provide maximum traction desired.

What is claimed is:

1. A vehicle tire traction device comprising:
    an attachment base having:
        an upper surface,
        a lower surface,
        a center portion, the center portion having a right end and a left end;
        wherein the center portion has a width substantially equal to a width of a tire;
        a first wing and a second wing continuously disposed on the right end and the left end, respectively;
        an adhesive layer continuously disposed on the lower surface of each of the center portion, the first wing, and the second wing, the adhesive layer being configured to secure the attachment base lower surface to a portion of a tire tread and each of the first wing and the second wing to a portion of each of a respective inner sidewall and outer sidewall of the tire; and
    an inner core having a top side, a bottom side, right side, left side, front side, and a rear side, the bottom side being continuously attached to the upper surface of the center portion, the inner core having a width equal to the width of the center portion;
    an outer traction surface continuously disposed on the bottom side of the inner core, wherein outer traction surface comprises a non-slip material; and
    a backing continuously removably disposed on the adhesive layer.

2. The vehicle tire traction device of claim 1 wherein the inner core is a plurality of compressed paper strips glued together in a stack.

3. The vehicle tire traction device of claim 2 wherein the non-slip material comprises at least one of an amount of sand and an amount of gravel.

4. The vehicle tire traction device of claim 1 wherein the inner core is a plurality of compressed wood chips glued together in a stack.

5. The vehicle tire traction device of claim 4 wherein the non-slip material comprises at least one of an amount of sand and an amount of gravel.

6. The vehicle tire traction device of claim 1 wherein the non-slip material comprises at least one of an amount of sand and an amount of gravel.

7. A vehicle tire traction device comprising:
    an attachment base having:
        an upper surface,
        a lower surface,
        a center portion, the center portion having a right end and a left end;
        wherein the center portion has a width substantially equal to a width of a tire;
        a first wing and a second wing continuously disposed on the right end and the left end, respectively;
        an adhesive layer continuously disposed on the lower surface of each of the center portion, the first wing, and the second wing, the adhesive layer being configured to secure the attachment base lower surface to a portion of a tire tread and each of the first wing and the second wing to a portion of each of a respective inner sidewall and outer sidewall of the tire; and
    a biodegradable inner core having a top side, a bottom side, right side, left side, front side, and a rear side, the bottom side being continuously attached to the upper surface of the center portion, the inner core having a width equal to the width of the center portion;
    an outer traction surface continuously disposed on the bottom side of the inner core, wherein outer traction surface comprises a non-slip material; and
    a backing continuously removably disposed on the adhesive layer.

8. The vehicle tire traction device of claim 7 wherein the inner core is a plurality of compressed paper strips glued together in a stack.

9. The vehicle tire traction device of claim 8 wherein the non-slip material comprises at least one of an amount of sand and an amount of gravel.

10. The vehicle tire traction device of claim 7 wherein the inner core is a plurality of compressed wood chips glued together in a stack.

11. The vehicle tire traction device of claim 10 wherein the non-slip material comprises at least one of an amount of sand and an amount of gravel.

12. The vehicle tire traction device of claim 7 wherein the non-slip material comprises at least one of an amount of sand and an amount of gravel.

13. The vehicle tire traction device of claim 7 wherein the base has a depth in the range of a half an inch to three inches.

* * * * *